UNITED STATES PATENT OFFICE.

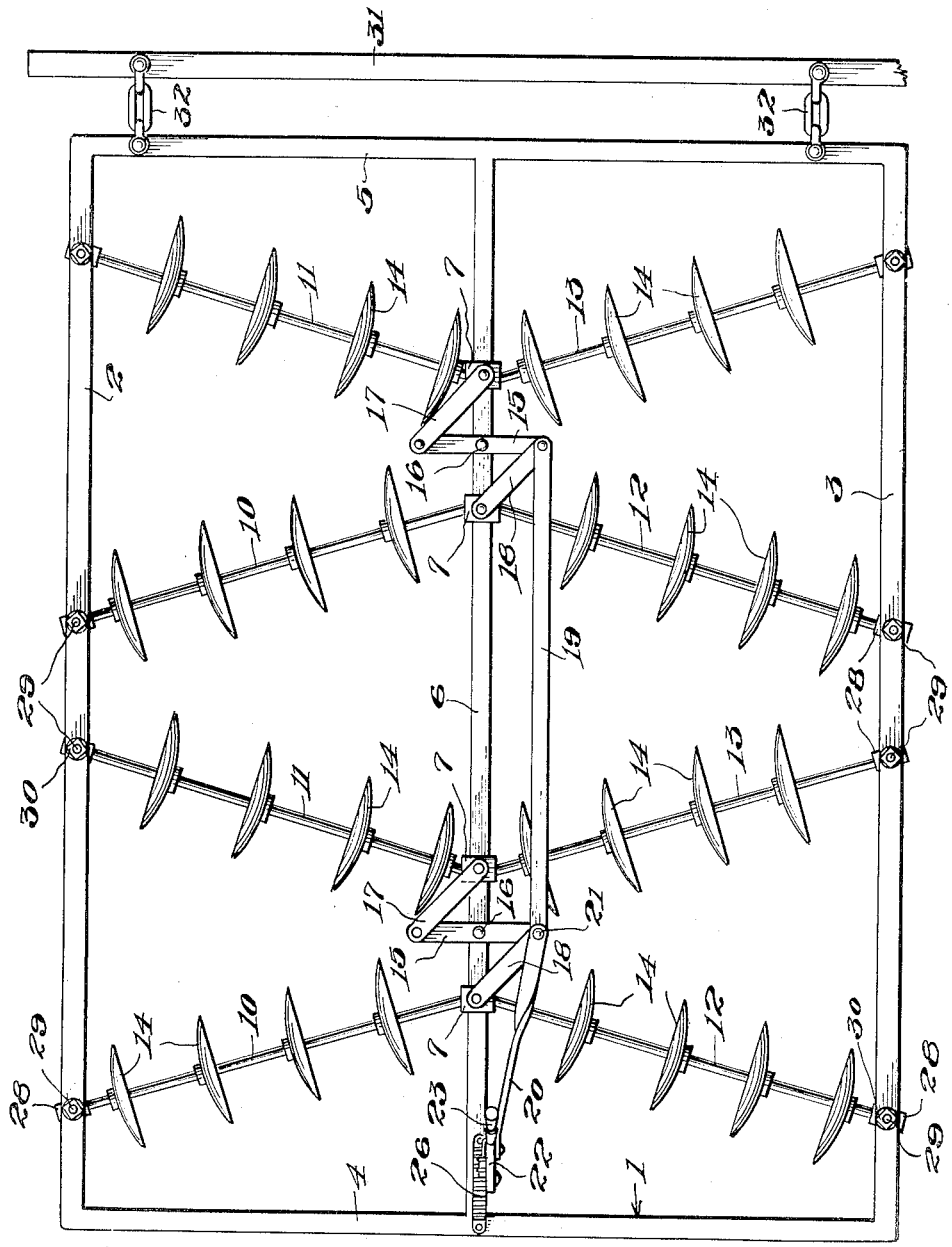

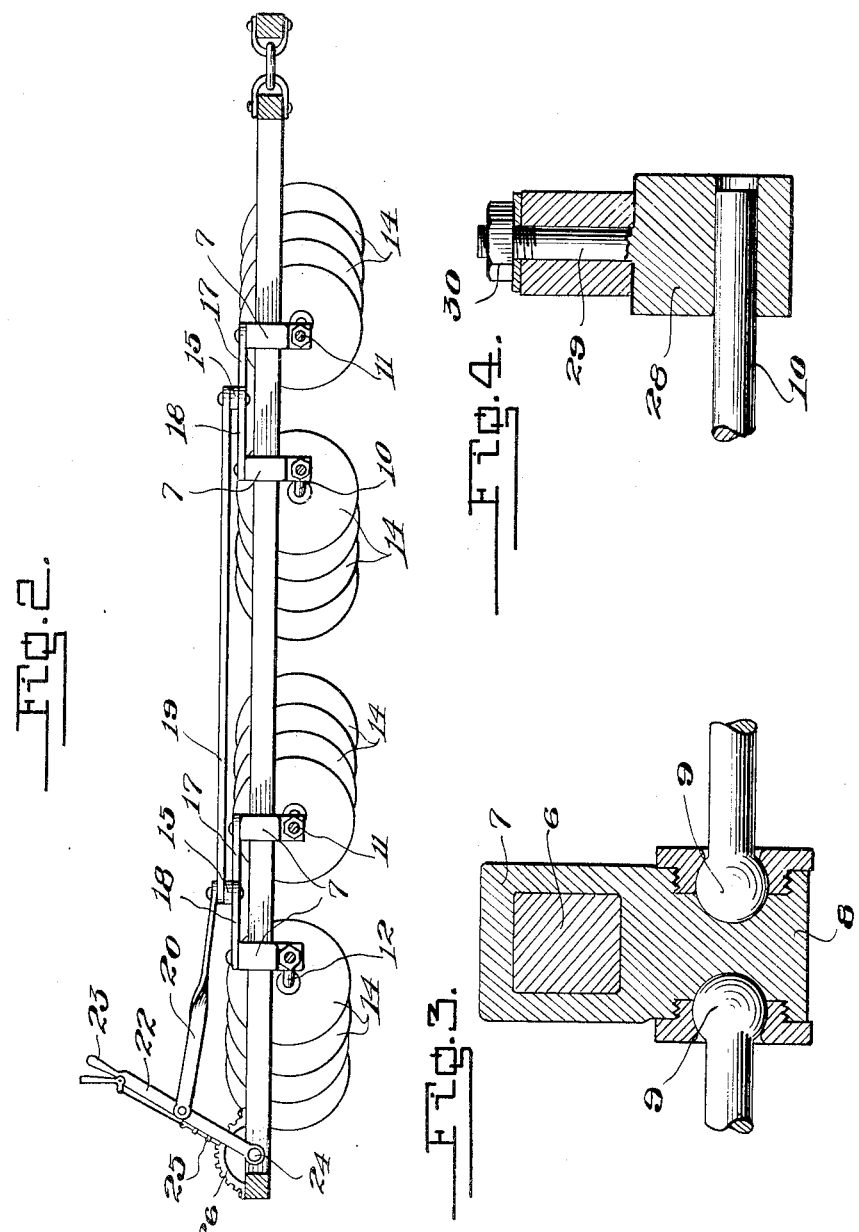

ALTON A. TRUMAN, OF HOWARD, SOUTH DAKOTA.

HARROW.

1,380,441.  Specification of Letters Patent.  Patented June 7, 1921.

Application filed April 14, 1919. Serial No. 289,913.

*To all whom it may concern:*

Be it known that I, ALTON A. TRUMAN, a citizen of the United States, residing at Howard, in the county of Miner and State of South Dakota, have invented certain new and useful Improvements in Harrows, of which the following is a specification.

This invention relates to harrows, and an object of the invention is to provide a sectional harrow structure which embodies relatively small disks in lieu of the usual type of spikes or teeth for breaking and stirring up the ground or pulverizing the same, thereby providing a harrow which is adapted for use on various types of soil, such as stalk surfaces, sod or other types of soil wherein the ordinary toothed harrow would not be efficient for preparing the bed.

A further object of the invention is to provide, in a harrow structure, as specified, means to permit the varying of the angle of the disk thereof for varying their cutting action to suit the condition of the soil which is being worked. More specifically, the invention comprehends the provision of a sectional harrow, each section of which comprises a rigid frame having a plurality of shafts arranged in angled relation, with respect to each other and the sides of the frame, said shafts being arranged in pairs, the corresponding shafts of one pair angling in an opposite direction to the corresponding shafts in the other pair thereby positioning the disk carried by the shaft at oblique angles with respect to each other and to the line of travel of the harrow or cutting and throwing the dirt or soil in both directions, to thoroughly and efficiently pulverize the same.

Other objects of the invention will appear in the following detailed description, taken in connection with the accompanying drawings, forming a part of this specification, and in which drawings:

Figure 1 is a top plan of the improved harrow.

Fig. 2 is a longitudinal section through the harrow.

Fig. 3 is a fragmentary section illustrating the manner of connecting the inner ends of the disk carrying shaft to the harrow frame, and Fig. 4 is a detail section illustrating the manner of slidably and pivotally connecting the outer ends of the shafts to the harrow frame to permit adjustment of the shaft to vary the angles of the disk carried thereby.

Referring more particularly to the drawings, wherein like characters indicate like and corresponding parts, 1 generically indicates the supporting frame of a section of the harrow. The frame is rectangularly shaped and comprises side bars or rails 2 and 3 which are connected by end pieces 4 and 5, which latter end pieces are braced by a central longitudinally extending bracing arm or bar 6.

The bar 6 has a plurality of boxes or castings 7 slidably mounted thereon, which castings have depending portions 8 to which the disk carrying shafts are connected by means of universal connections as indicated at 9 in Fig. 3 of the drawings.

The disk carrying shafts, as clearly shown in Fig. 1 of the drawings are arranged in sets, each set comprising four shafts 10, 11, 12 and 13, the shafts of each set being arranged in pairs upon the opposite sides of the center brace bars 6 and normally converging toward said center brace bar 6 as clearly shown in Fig. 1 of the drawings, thereby positioning the earth working disk 14, upon the shafts of each pair in opposed relation to each other, the disks carried by one shaft, namely the rearmost shaft having their concaved surfaces facing toward the center of the sections, while the disks 14 carried by the forward shafts of each pair have their concaved surfaces facing outwardly or toward the side of the frame 1. This opposite positioning of the disks, will tend to throw the soil in opposite directions, resulting in the thorough pulverizing thereof. The shafts 10 and 12 which are positioned upon opposite sides of the bar 6 and the corresponding shafts of the separate pairs of each set angle in opposite directions and when a plurality of shafts and disks 14 are employed in a section of harrow, it will be seen that a staggered relation of the disks 14 is provided, thereby insuring the turning and pulverizing of the entire surface over which the harrow travels.

The varying condition of soil will necessitate the adjustment of the angle of the disks 14 with respect to the line of travel of the harrow, to efficiently pulverize the soil, and to accomplish this purpose, links or levers 15 are pivotally mounted intermediate their ends as shown at 16 to the central brace bar 6 and they have links 17 and 18 connected to their opposite ends and to the castings 7 which are slidably mounted upon the longitudinal brace bar 6. The levers 15, two of which are provided in the preferred form as illustrated in Fig. 1 of the drawings, one for each set of the shafts and disks are connected, by a bar 19 for simultaneous movement.

A second bar 20 is connected to the rearmost pivoted lever 15 at one of its outer ends as shown at 21 and this bar 20 is connected to a hand lever 22, intermediate the hand grip 23 thereof and the pivot 24 thereof as clearly shown in Fig. 2 of the drawings. The usual type of dog mechanism 25 is carried by the lever 22 for co-action with the quadrant 26 to hold the lever in adjusted position and consequently hold the various shafts of the set at the desired angles. The pivotal movement of the lever 22 will rock the levers 15, and shift the castings 7 longitudinally upon the brace 6, varying the angles of the shaft with respect to each other and to the line of travel of the harrow. To permit this longitudinal shifting of the casting 7 upon the brace 6, the outer end of the shafts 10, 11 and 12 and 13 of each set, extend slidably through bearing members 28 which are pivotally connected by means of shanks 29 formed thereupon, which extend upwardly through the side rails 2 and 3 and are held against longitudinal movement with respect to the side rails by nuts 30, thus providing pivotal and slidable connections between the outer ends of the shafts, 10, 11, 12 and 13, of each set, and the side rails 2 and 3 of the rigid brace 1, allowing the adjustment of the angles of the shaft and the disks 14 carried thereby with respect to the line of travel of the harrow to properly pulverize the soil.

The frame 1 may have any suitable type of draft bar 31 connected thereto by means of flexible connections as shown at 32. This bar 31 in lieu of being used as a draft bar may be employed to connect a plurality of the sections of harrow, one of which is illustrated in Fig. 1 when desired.

Charges in details may be made without departing from the spirit of this invention, but;

I claim:

1. In a harrow, the combination, of a rigid frame comprising side rails, and a longitudinally extending center brace, a casting slidably carried by said brace, a pair of shafts disposed in angled relation to each other and to the line of travel of the frame, universal joints connecting the inner ends of said shafts to said casting, bearings pivotally carried by the side rails of said frame, the outer ends of said shafts extending slidably through said bearings, means for shifting said castings longitudinally upon said center brace, pulverizing disks upon said shafts, a second casting slidably carried by said center rail, a second pair of shafts disposed at oblique angles to each other and having their inner ends pivotally connected to said second slidable casting, means pivotally and slidably connecting the outer ends of said last-named shafts to said side rails, pulverizing disks mounted upon said second-named shaft, the pulverizing disk upon one shaft being disposed in opposed relation to the shaft next thereto, and means operatively connecting the second mentioned casting with the first mentioned casting.

2. In a harrow, the combination, of a rigid frame comprising side rails and a center brace, a plurality of castings slidably mounted upon said center brace, a plurality of shafts arranged in pairs and extending at oblique angles to each other and to the line of travel of the frame, universal joints connecting the inner ends of said shafts to said castings, bearing castings pivotally supported by said side rails, the outer ends of said shafts slidably extending through said bearing castings, a lever pivotally connected to said center brace, means connected to said lever and to said castings for shifting the castings longitudinally upon the center brace for pivotal movement of the lever, pulverizing disks carried by said shafts, a hand lever pivotally supported by said brace, means connecting said hand lever to said first-named pivoted lever for rocking the latter upon pivotal movement of the hand lever, the disks carried by said shafts being disposed in opposed and staggered relation to the disks upon the shaft next thereto.

ALTON A. TRUMAN.